D. S. PATERSON.
NUT LOCK.
APPLICATION FILED JULY 23, 1909.

972,086.

Patented Oct. 4, 1910.

Witnesses:

Inventor
Dugald S. Paterson
By his Attorneys ated extending obliquely downward, it is obvious

UNITED STATES PATENT OFFICE.

DUGALD S. PATERSON, OF PHILADELPHIA, PENNSYLVANIA.

NUT-LOCK.

972,086.     Specification of Letters Patent.     Patented Oct. 4, 1910.

Application filed July 23, 1909. Serial No. 509,146.

*To all whom it may concern:*

Be it known that I, DUGALD S. PATERSON, a citizen of the United States, residing in the city of Philadelphia, county of Philadelphia, and Commonwealth of Pennsylvania, have invented certain new and useful Improvements in Nut-Locks, of which the following is a full, clear, and exact specification.

My invention relates to nut locks and is particularly adapted for use on railroad rails.

It has for its object to provide a simple and efficient nut lock that will fit varying sizes of rails and will lock the nut irrespective of the precise location of the bolt, and to this end my invention consists in the employment of a locking plate having an ear or ears adapted to be bent around the sides of the nut and having an arm longer than the distance between the bolt and the flange extending obliquely and locking the nut by contact with the flange of the rail or fish plate.

An advantageous manner of employing my invention is illustrated in the accompanying drawing wherein—

Figure 1:
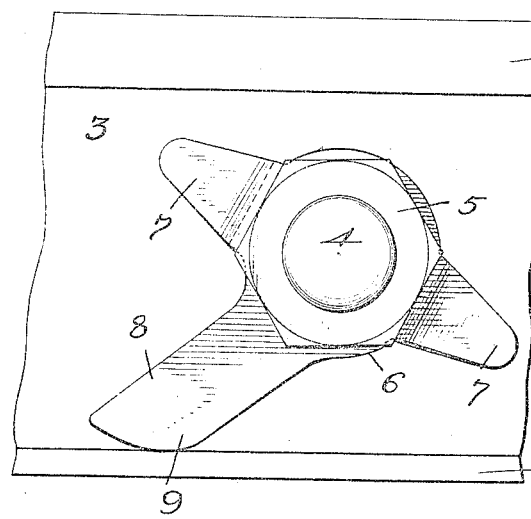
Figure 2:
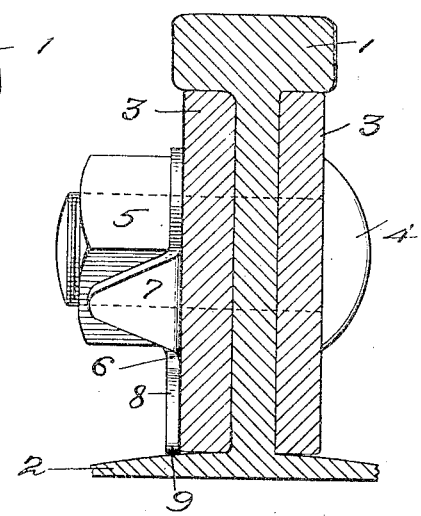
Figure 4:
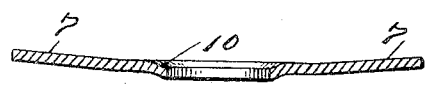
Figures 3, 5, 6:
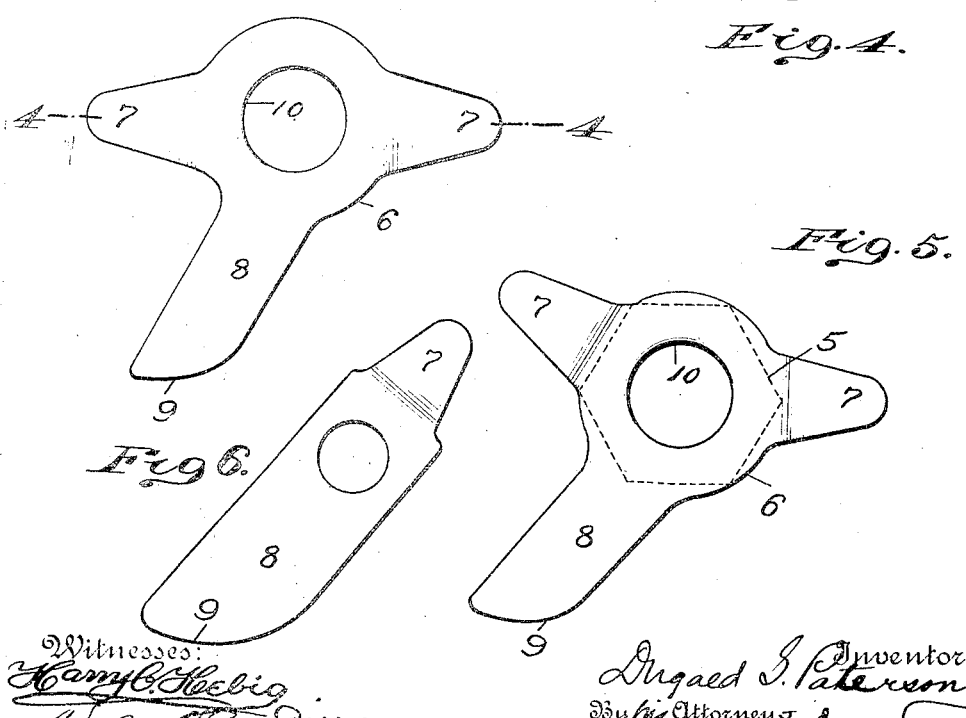

Figure 1 is a side elevation of a rail having my locking plate in place prior to bending the ears around the nut. Fig. 2 is a cross-section through the rail showing the ears bent up around the nut. Fig. 3 is a detail view of the locking plate. Fig. 4 is a section on the line 4—4 of Fig. 3. Fig. 5 is a modified form of plate; and Fig. 6 is a modified form of plate employing only one locking ear.

Locking plates for nut locks as heretofore employed, so far as I am aware, have had an arm extending vertically which was either bent around the fish plate or had a straight edge resting on the rail flange, and this requires plates of different sizes for varying locations of the bolt relative to the rail flange or fish plate, as it is obvious that if the distance between the bolt and flange was greater than expected, there would be a corresponding amount of play. I have produced a locking plate which will lock the nut notwithstanding variations in the distance from the bolt hole to the flange.

In the drawings the rail 1 has flange 2, and the fish plates 3 are secured to the rail by bolt 4, having nut 5. Before the nut is applied to the bolt I place a perforated locking plate 6 thereon. This plate is provided with locking ears 7, which are preferably slightly bent before application to permit the ears to be easily bent up around the sides of the nut by tapping with a hammer, as illustrated in Fig. 4. The locking plate is also provided with a locking arm 8, which extends obliquely downward therefrom so that the foot 9, which is represented as beveled or slightly rounded, will rest upon the flange of the rail in about the position illustrated in Fig. 1. The metal of the locking plate surrounding the perforation is preferably depressed as at 10, forming a cushion for seating the nut. It will be perceived that this locking arm need be made but slightly longer than the maximum distance between the bolt and the flange on a rail and that it will then adapt itself to any and all rails. If the bolt is located nearer the flange, the arm 8 will approach a horizontal position, while if it is located farther away from the flange, the arm will approach a vertical position. In some instances it may be desirable to offset one of the ears rather than place them directly opposite, and in Fig. 5 I have shown them so disposed. With the hexagonal nuts customarily employed, I believe the ears illustrated in Fig. 1 will serve to hold the nut in any position, as these locking plates may be easily stamped out of sheet metal and its ductile character will permit of the ear being bent up so as to lock it, even if the side of the nut should not be at right angles to the longitudinal axis of the ear. The depressed portion 10 of the plate acting as a cushion will permit the nut to be further screwed down after it has become seated if desired, whereby it can be brought to the desired position to receive the ear or ears of the plate.

The number of ears employed will depend somewhat upon the weight of the sheet metal used. If this is light a plurality of bent ears may be necessary, while if it is heavy one bent ear may secure the nut effectually.

Inasmuch as the hexagonal nut is almost universally employed for the purpose stated and as this can be securely held by one bent ear, I have in Fig. 6 illustrated a form of locking plate employing but one ear and this I believe to be the most practicable form of construction, particularly with the depression in the locking plate.

While I have illustrated the locking face 9 as beveled, this is not essential. It is, however, essential that the length of the arm 8 should exceed the distance between the bolt and the flange.

While I have referred to the locking arm as engaging the flange of the rail, I of course intend to include the flange of the fish plate where such fish plates are provided with such flange, and in the specification and claims by the use of such term "flange," I intend to include either the rail flange or the fish plate flange.

This nut lock, while particularly designed as a nut lock for railway rails, can also be used in other cases where a nut is located within a reasonable distance of a flange or its equivalent abutment, as for instance, for transportation equipment and general machinists' use.

What is claimed is:

1. The herein described nut lock consisting of a plate of metal having a substantially circular central portion provided with a centrally disposed bolt receiving opening, the metal surrounding said opening being dished to form an annular projection from one side of the plate, said projection having a cross-section arcuate in shape with its inner end having an edge projecting beyond the remainder of the nut lock in the direction of said side whereby said edge contacts primarily with the surface to which the plate is applied, a locking arm extending from the edge of the circular portion and adapted to contact with a fixed object when the nut lock is in position whereby the rotation of the plate is prevented, and locking ears extending outward from the central portion and bent in a direction opposite to the dish of said central portion.

2. The herein described nut lock consisting of a plate of metal having a portion provided with a bolt receiving opening, the metal surrounding said opening being dished to form an annular projection from one side of the plate, said projection having a cross-section arcuate in shape with its inner end having an edge projecting beyond the remainder of nut lock in the direction of said side whereby said edge contacts primarily with the surface to which the plate is applied, a locking arm extending from the edge of the portion surrounding the opening and adapted to contact with a fixed object when the nut lock is in position whereby the rotation of the plate is prevented, and a locking ear extending outward from the said portion and bent in a direction opposite to the dish of said portion.

In witness whereof I have hereunto set my hand in the presence of two subscribing witnesses.

DUGALD S. PATERSON

Witnesses:
ADOLPH F. DINSE,
HENRIETTA E. WORKMAN.